Patented June 15, 1943

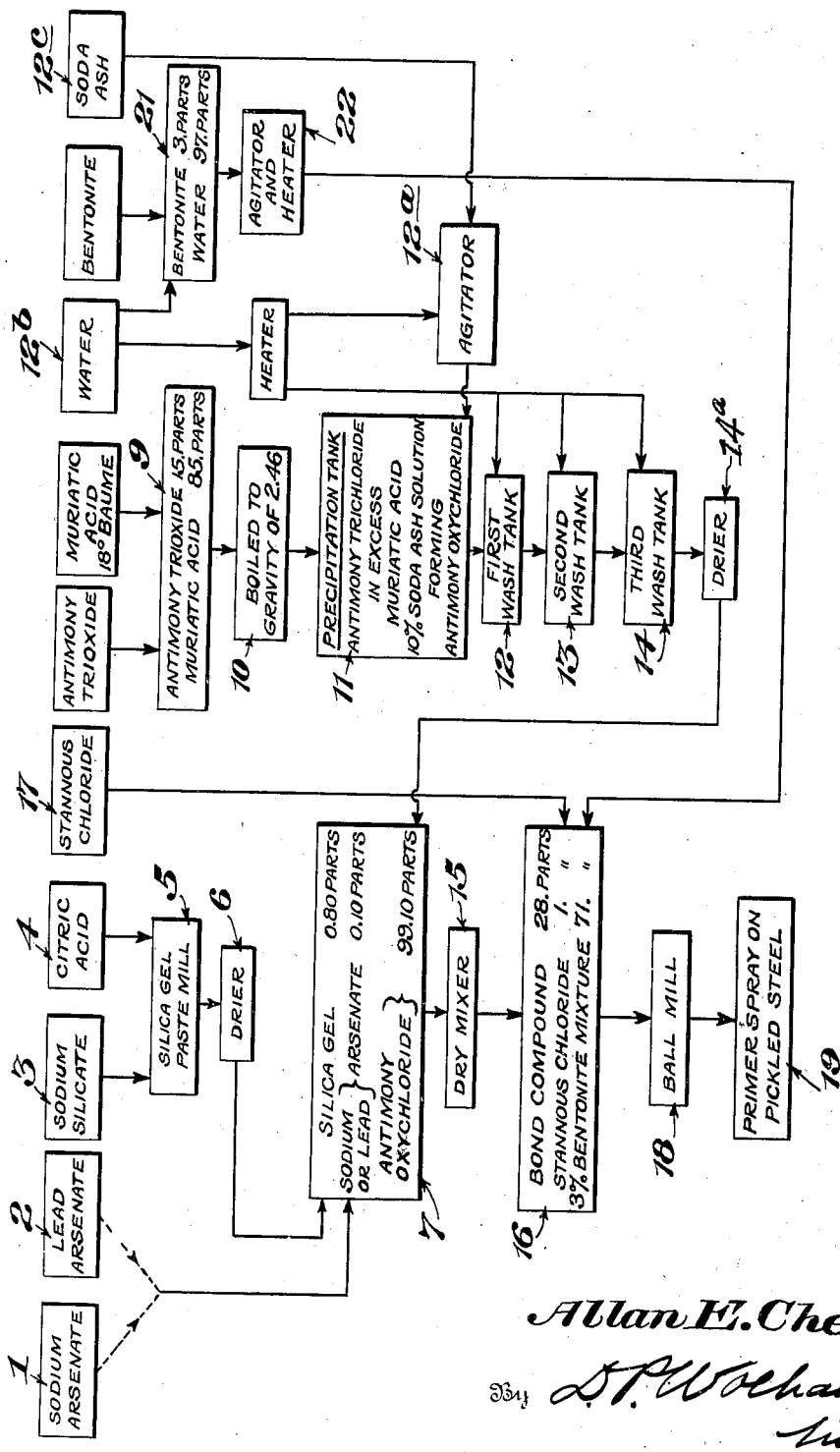

2,321,658

UNITED STATES PATENT OFFICE 2,321,658

PROCESS FOR USE IN COATING METAL SURFACES

Allan E. Chester, Chicago, Ill., assignor to Poor & Company, Chicago, Ill., a corporation of Delaware Application June 27, 1941, Serial No. 400,102

1 Claim. (Cl. 148—7)

This invention relates to a process for use in enamel coating ferrous metals involving the use of materials or bonding agents to control the amount or degree of thermal oxidation, the invention having as a primary purpose the elimination of the cobalt-manganese ground or bonding coats extensively employed in enameling procedure which, because of their dark blue or blue-black color require a multiplicity of operations to provide a decorative enamelled surface.

The invention, therefore, primarily has in view a process for use in enamel-coating ferrous metals which consists in subjecting the metal sheet, after pickling thereof, to an aqueous colloidal suspension having as its base antimony oxychloride. This suspension possesses special utility as a spray to provide a thin, evenly dispersed primer coat on the ferrous metal surface, which will insure complete adherence of the subsequent enamel color-coat, it being another special object of the invention to have these two coats of a total thickness within the range of 5/1000 to 10/1000 of an inch thick and capable of being used upon a thin metallic sheet of 26 gauge or lighter. While that is a special object of the invention it will of course be understood that the new bonding compound is available for use on any ferrous metal sheet regardless of its thickness.

The distinctive object of the present invention is to provide a bonding compound of a special formula, which is processed in a special manner, contains no vitrifiable ingredients or elements, and does not require firing nor drying, but is particularly useful as a spray, the same being of such a composition that the enamel frit or enamel coat can be applied directly thereto while wet, after which the firing of the completely coated metal sheet can be carried out.

The drawing is a diagrammatic flow-sheet indicating the special processing steps employed in preparing and developing the new bonding compound, preliminary to spraying the same as a priming coat on the metal sheet to be enameled.

In carrying forward the invention the new bonding compound, as a colloidal suspension for spraying is preferably made up according to the formulae and procedure as exemplified by the flow-sheet drawing, to wit:

As stated, the base of the new bonding compound is antimony oxychloride which is indicated at 11 on the drawing. As another ingredient or element of the new bonding compound there is separately prepared a quantity of silica gel formed by a mixture of sodium silicate and citric acid, as indicated by numerals 3 and 4 on the flow sheet. This mixture is passed into a crutcher or paste mill 5 and from there into a dryer 6 and then brought into union at stage 7 with either lead or sodium arsenate indicated at 1 and 2 in the proportion of parts by weight of silica gel 0.80 and lead or sodium arsenate 0.10. At this stage of the process, as indicated at 7, the silica gel and arsenate are combined with antimony oxychloride, which constitutes the major content of the compound, that is, in the quantity of 99.10 parts as indicated at stage 7 on the flow sheet.

The antimony oxychloride, which is brought into union with the silica gel and arsenate, at stage 7, of the processing of the bonding compound, is separately developed in a series of operations originating with the raw materials, antimony trioxide and muriatic acid, which are combined at stage 9 of the flow sheet, in the probined at stage 9 of the flow sheet, in the proportions of antimony trioxide 15 parts by weight and 18° Baumé muriatic acid 85 parts by weight. This acid solution is boiled in cooking vats, as at 10, until the liquid reaches a gravity of 2.46 and is then passed to a precipitation tank, as at 11, in which the then formed antimony tri-chloride in excess muriatic acid is precipitated as antimony oxychloride by the addition of 5 to 10 parts of hot 10% soda ash solution, from a suitable agitator at step 12$^a$, which agitator is supplied with heated water from a source of water supply indicated at 12$^b$ and with soda ash from the source of soda ash supply indicated at 12$^c$, to 1 part of the mother liquor of antimony tri-chloride. Then the precipitate is washed, as indicated by the series of wash tanks 12, 13 and 14, followed by drying as at 14$^a$. The antimony oxychloride is then combined with the silica gel and arsenate at the process stage 7, heretofore indicated.

The mixture, at stage or step 7, composed of silica gel and sodium arsenate or lead arsenate, or both, and the antimony oxychloride, is introduced into a dry mixer, indicated at 15, and is then, at step or stage 16, combined with stannous chloride from a suitable source, indicated at 17, and with a 3% bentonite mixture, as a suspending agent, in the proportion of basic bonding compound mixture of stage 7 of 28 parts, stannous chloride 1 part, and 3% bentonite mixture 71 parts, thereby combining all of the ingredients of the new bonding compound. This complete mixture at step or stage 16 is then introduced into a ball mill, as indicated at 18, where it is ground to a superfineness so that the resulting colloidal suspension, as at 19, can be sprayed in a very thin film, as a primer spray, on the previously pickled metal sheet or ware.

The 3% bentonite mixture, which is one of the final ingredients or components introduced into the bonding compound mixture, is specially prepared as indicated, that is to say, at step 21, three parts by weight of bentonite is combined with 97 parts by weight of water and the mixture thoroughly heated and agitated at 22, from which point it is directly brought into union with the other bonding compound ingredients, at step 16.

As will have been observed the antimony oxychloride predominates as a major ingredient of the new bonding compound, the chlorine radical being freed in the thermal treatment and acting as an oxidizing factor to insure the formation of an adequate quantity of iron oxide to provide a firm adherence or bonding iron-silicate layer, and the antimony acting as a reducing agent to lower the valence of such iron oxide to provide for the formation of alpha dendritic iron as a locking mechanism between the bonding layer and the vitreous body. The small amount of an insoluble arsenic salt present has been found to increase materially the bonding effect, as have small quantities of other group II elements, in particular stannous chloride. Bentonite, a colloidal clay, has been found to provide a suitable suspending agent which is not de-flocculated by the chlorides in solution, nor adversely affected by the slow hydrolysis of the antimony oxychloride.

An example of glass or frit which can be used with the bonding method is as follows:

| | Parts by weight |
|---|---|
| Feldspar | 20.9 |
| Borax | 40.2 |
| Silica | 22.9 |
| Soda ash | 5.1 |
| Sodium nitrate | 4.8 |
| Fluorspar | 6.1 |

This material is mixed, smelted, fritted and dried in the usual manner, and to produce a light grey coating the mill additions of the above will be as follows:

| | | |
|---|---|---|
| Frit | parts by weight | 100 |
| Clay | parts by frit weight | 7 |
| Opacifier | do | 3 |
| Ilmenite | do | 5/8 |
| Black oxide iron | do | 5/16 |
| Borax | do | 3/4 |
| Water | do | 40 |

This material is ground or milled to a fineness of 0–25% residue on a 200 mesh screen, preferably 4–8% residue, and the metal as previously sprayed with the new bonding compound described is then coated with this milled slip by spraying. Finally the coated piece is dried and fired at a temperature below 1580° F., e. g. in a range between 1260° to 1580° F.

In the method described the temperature employed for firing the coated metal may be much lower than that employed in the conventional sheet metal enamel processes, thereby permitting the invention to be carried out in connection with lighter gauge metal sheets than heretofore possible.

From the foregoing description it is thought that the essentials of the invention are fully defined, but it will be understood that any modifications or alterations in details of procedure, or in the proportion of parts employed, falling within the scope of the appended claim may be utilized, without departing from the spirit of the invention.

I claim:

A process of preparing a bonding compound for use in enamel-coating processes, which consists in first preparing a basic mixture composed of antimony oxychloride, silica gel, and an alkaline arsenate salt, then dry mixing said basic mixture and subsequently combining the same in an aqueous colloid with stannous chloride and bentonite to complete the composition, and finally grinding the said complete composition to a fineness for use as a spray.

ALLAN E. CHESTER.